United States Patent
Amento et al.

(10) Patent No.: US 10,748,229 B2
(45) Date of Patent: Aug. 18, 2020

(54) METHOD AND APPARATUS FOR CONTROLLING A ROADWAY SOURCE

(71) Applicant: AT&T Intellectual Property I, L.P., Atlanta, GA (US)

(72) Inventors: Brian S. Amento, Morris Plains, NJ (US); Matti A. Hiltunen, Morristown, NJ (US); Kaustubh Joshi, Scotch Plains, NJ (US); David P. Kormann, Morristown, NJ (US); Rajesh Krishna Panta, Bridgewater, NJ (US); Kermit Hal Purdy, Bernardsville, NJ (US); Thomas M. Smith, Westfield, NJ (US); Alex Varshavsky, East Hanover, NJ (US); Svetlana Yarosh, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 994 days.

(21) Appl. No.: 14/133,408

(22) Filed: Dec. 18, 2013

(65) Prior Publication Data

US 2015/0170310 A1    Jun. 18, 2015

(51) Int. Cl.
*G06Q 10/06* (2012.01)
*G06Q 50/30* (2012.01)
(Continued)

(52) U.S. Cl.
CPC ......... *G06Q 50/30* (2013.01); *G01C 21/3461* (2013.01); *G06Q 20/145* (2013.01)

(58) Field of Classification Search
USPC ....... 705/1.1, 7.11, 7.12; 340/928; 435/68.1; 701/117; 434/130.1
See application file for complete search history.

(56) References Cited

U.S. PATENT DOCUMENTS

| 6,088,680 A | 7/2000 | Hoshino et al. |
| 6,278,935 B1 | 8/2001 | Kaplan et al. |

(Continued)

FOREIGN PATENT DOCUMENTS

| CA | 2455829 | 5/2004 |
| GB | 1219123 A | 1/1971 |

(Continued)

OTHER PUBLICATIONS

Blythe, Phil. "RFID for road tolling, road-use pricing and vehicle access control." RFID Technology (Ref. No. 1999/123), IEE Colloquium on IET, 1999. http://120.109.32.19/8_lab/RFID_reference/11/getPDF.pdf.

(Continued)

*Primary Examiner* — Akiba K Robinson (57) ABSTRACT

A method and computer-readable storage device and apparatus for controlling a roadway resource are disclosed. For example, the method receives from a device associated with a vehicle a request to reach a target destination by a target arrival time and a maximum payment amount to reach the target destination by the target arrival time. The method next determining a route to the target destination and determines a roadway resource along the route that is controllable. The method then sends an instruction to the device associated with the vehicle, where the instruction indicates to navigate the vehicle along the route and controls the roadway resource to enable the vehicle to reach the target destination by the target arrival time.

20 Claims, 4 Drawing Sheets

(51) Int. Cl.
  *G01C 21/34* (2006.01)
  *G06Q 20/14* (2012.01)

(56) References Cited

U.S. PATENT DOCUMENTS

| | | |
|---|---|---|
| 7,091,880 B2 | 8/2006 | Sorensen |
| 7,320,430 B2 | 1/2008 | Dawson et al. |
| 7,398,924 B2 | 7/2008 | Dawson et al. |
| 7,501,961 B2 | 3/2009 | Robinson et al. |
| 7,734,500 B1 | 6/2010 | Allen et al. |
| 7,969,325 B2 | 6/2011 | Hamilton et al. |
| 8,065,181 B2 | 11/2011 | Mcnew et al. |
| 8,149,139 B2 | 4/2012 | Coffee et al. |
| 8,200,529 B2 * | 6/2012 | Hamilton, II ......... G06Q 30/02 235/384 |
| 8,219,443 B2 | 7/2012 | Delia et al. |
| 8,548,673 B2 | 10/2013 | Hada |
| 8,571,740 B2 | 10/2013 | Hyde et al. |
| 2003/0020634 A1 | 1/2003 | Banerjee et al. |
| 2009/0157297 A1 * | 6/2009 | Hagiwara .......... G01C 21/3461 701/418 |
| 2009/0171772 A1 | 7/2009 | Petrisor et al. |
| 2009/0313096 A1 | 12/2009 | Kaga |
| 2010/0153193 A1 | 6/2010 | Ashby et al. |
| 2013/0191190 A1 | 7/2013 | Mandel et al. |
| 2014/0278052 A1 * | 9/2014 | Slavin ................ G01C 21/3492 701/400 |

FOREIGN PATENT DOCUMENTS

| | | |
|---|---|---|
| GB | 2450079 A | 12/2008 |
| JP | 8096181 A | 4/1996 |
| JP | 2002133469 A | 5/2002 |
| JP | 2003178343 A | 6/2003 |

OTHER PUBLICATIONS

Brownstone, David, et al. "Drivers willingness-to-pay to reduce travel time: evidence from the San Diego I-15 congestion pricing project" Transportation Research Part A: Policy and Practice 37.4 (2003): 373-387. http://escholarship.org/uc/item/3mx1d1k4#page-4.

Burris, Mark W. "Application of variable tolls on congested toll road." Journal of transportation engineering 129.4 (2003): 354-361. https://ceprofs.civit.tamu.edu/mburris/papers/application%20of%20vatiable%20tolls%20on%20a%20congested%20toll%20road%20-%20asce.pdf.

Small, Kenneth A., and Jia Yan. "The value of 'value pricing' of roads: Second-best pricing and product differentiation." Journal of Urban Economics 49.2 (2001): 310-336. http://escholarship.org/uc/item/9569k1sz#page-3.

Nagae, Takeshi, and Takashi Akamatsu. "Dynamic revenue management of a toll road project under transportation demand uncertainty." Networks and Spatial Economics 6.3-4 (2006): 345-357. http://www.plan.civil.tohoku.ac.jp/~akamatsu/Publications/PDF/2006-NSE-06-p0345.pdf.

* cited by examiner

METHOD AND APPARATUS FOR CONTROLLING A ROADWAY SOURCE

BACKGROUND

Traffic congestion is a major waste of time, money and resources, and contributes to additional pollution with no corresponding societal benefit. For instance, in the United States it is estimated that 2.9 billion gallons of fuel are wasted each year, translating to $121 billion in lost time and fuel costs, and 5.6 billion pounds of additional carbon dioxide emissions. This corresponds to a per-commuter loss of $818 and an extra 380 pounds of carbon dioxide emitted. In addition, the average commuter spends 38 hours per year, almost an entire work week, sitting in traffic. To address these and other problems, various approaches to traffic management have been deployed, e.g., high occupancy vehicle (HOV) lanes and the like.

SUMMARY

In one embodiment, the present disclosure describes a method, computer readable storage device and apparatus for controlling a roadway resource. For example, the method receives from a device associated with a vehicle a request to reach a target destination by a target arrival time and a maximum payment amount to reach the target destination by the target arrival time. The method next determining a route to the target destination and determines a roadway resource along the route that is controllable. The method then sends an instruction to the device associated with the vehicle, where the instruction indicates to navigate the vehicle along the route and controls the roadway resource to enable the vehicle to reach the target destination by the target arrival time.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method, computer-readable storage device and apparatus for controlling a roadway resource. For example, in one embodiment, a user may incur a fee to control adaptive traffic lights, or other roadway resources, to ensure that he or she reaches a target destination in a desired or target time. For instance, before a trip is taken the user may input the destination and a desired/target arrival time. Responsive to the user inputs, the system may calculate a route and the associated cost to charge the user. In one embodiment, the calculation may be based upon the number of traffic lights to control, the current traffic condition, the current time of day, requests from other users and other conditions. Although the present disclosure is discussed below in the context of exemplary dedicated short range communication (DSRC) networks and cellular access networks, the present disclosure is not so limited. Namely, the present disclosure can be applied to various types of communication networks using various types of communication protocols, e.g., a combination of any one or more of: wired and wireless local area network (LANs), wide area networks (WANs), various types of cellular networks, e.g., general packet radio service (GPRS) networks, uniform terrestrial radio access networks (UTRANs), Global System for Mobile Communications (GSM) networks, Long Term Evolution (LTE) networks, and the like, satellite networks, the Internet in general and so forth.

Figure 1:
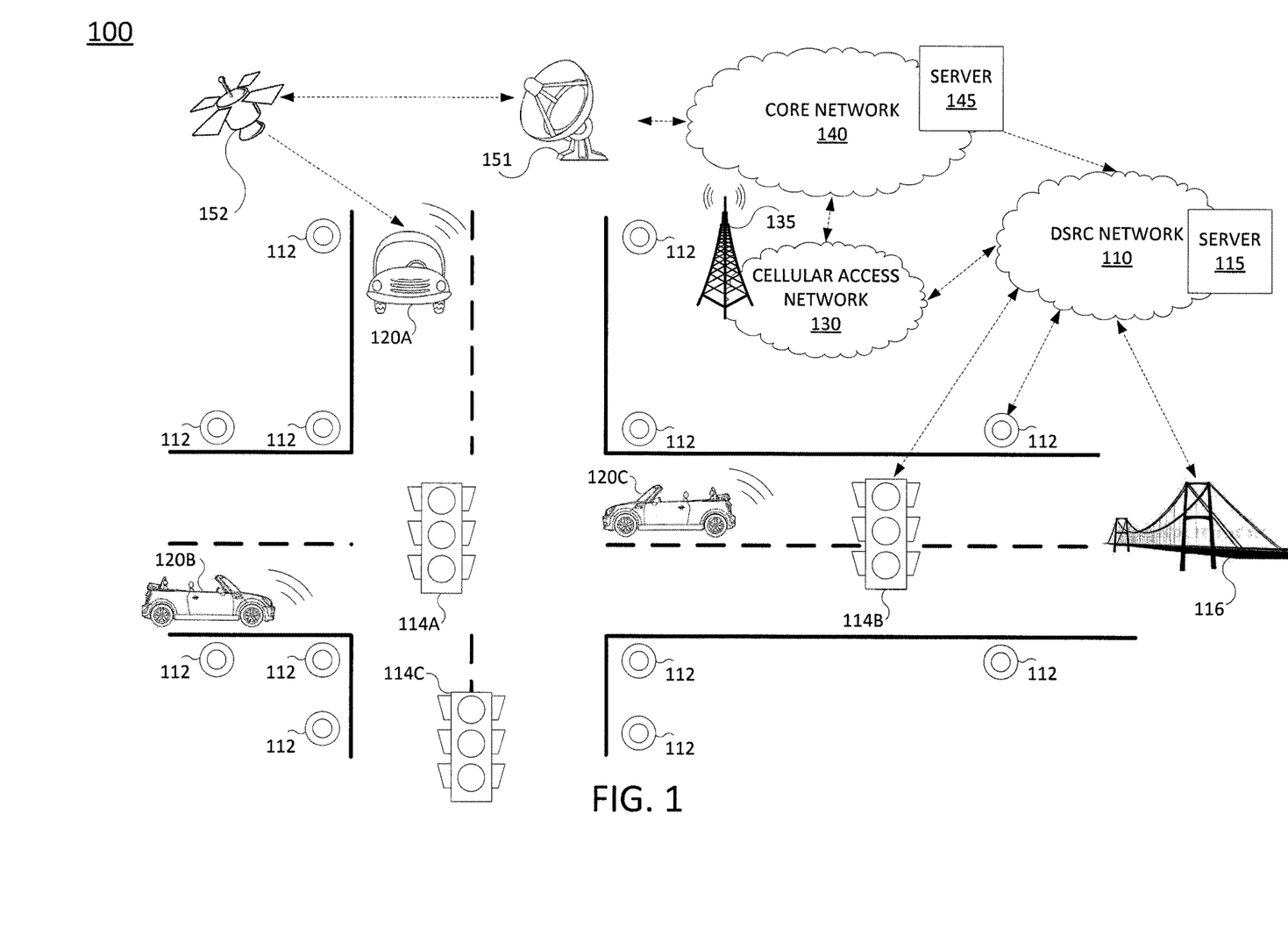
FIG. 1 illustrates an exemplary network related to the present disclosure.

To aid in understanding the present disclosure, FIG. 1 illustrates an exemplary network 100 related to the present disclosure. In one illustrative embodiment, the network 100 comprises a core network 140, a cellular access network 130 and a dedicated short range communication (DSRC) network 110. In one embodiment, cellular access network 130 may comprise a Universal Terrestrial Radio Access Network (UTRAN), or an evolved Universal Terrestrial Radio Access Network (eUTRAN) and the base station 135 may comprise a NodeB or an evolved NodeB (eNodeB). In one example, the core network 140 comprises an Evolved Packet Core (EPC) network. In another embodiment, core network 140 comprises an IP network and/or the Internet in general. In still another example, the cellular access network 130 may comprise a basic service set and the base station 130 may comprise a base transceiver station (BTS). In other words, cellular access network 130 may comprise a second generation (2G) network, a third generation (3G) network, a fourth generation (4G) network and/or a Long Term Evolution (LTE) network, and so forth.

In one embodiment, the network 100 also includes a satellite portion with a satellite uplink 151 and satellite 152. In one embodiment, the cellular access network 130, the core network 140, the DSRC network 110 and/or the satellite portion may be operated by different service providers, the same service provider or a combination thereof. For example, DSRC network 110 may be operated by a governmental entity or a private entity managing a transportation region on behalf of a governmental entity. On the other hand, cellular access network and/or core network may be operated by a telecommunications network service provider. In one embodiment, the satellite portion of the network 100 may be operated by the same or a different telecommunications service provider as that of the cellular access network 130 and/or core network 140. Various interconnections between DSRC network 110, cellular access network 130, core network 140 and other components are shown. In accordance with the present disclosure, it is contemplated that various communication devices may utilize any one or a combination of such networks and interfaces in order to communicate with one another.

In one embodiment, the internal communications of the DSRC network 110 may use a 75 MHz frequency band around 5.925 GHz assigned by the Federal Communication Commission (FCC) of the United States for Intelligent Transportation Systems, or DSRC networks. In general, DSRC networks enable wireless vehicle-to-vehicle communications and vehicle-to-infrastructure communications. DSRC networks have been proposed for transmitting safety and road condition information to vehicles, to warn of traffic and weather, to sense nearby vehicles (e.g., blind spot detection), and so forth. In this regard, DSRC networks contemplate an on-board unit (OBU) for DSRC enabled vehicles to transmit, as well as to receive and display messages.

Accordingly, as illustrated in FIG. 1, DSRC network 110 may interconnect and control a number of infrastructure elements, also referred to herein as roadway resources, which include roadside units (RSUs) 112, traffic lights 114A-114C, as well as bridge 116. Other infrastructure elements that are not specifically illustrated in FIG. 1 may also comprise part of the DSRC network 110, e.g., a tunnel, a restricted access gate, and so forth. DSRC network 110 also includes at least one server 115 for managing infrastructure elements, for communicating with other elements and for controlling other aspects of the DSRC network 110. For example, any one or more of the functions described herein with respect to the DSRC network 110 may be performed by server 115, a plurality of servers of DSRC network 110 and/or a plurality of servers deployed in a distributed environment (e.g., in a "cloud-based" environment). For instance, DSRC network 110/server 115 may control the timing of traffic lights 114A-114C, may coordinate the timing of two or more of traffic lights 114A-114C in a synchronized manner, may control an access signal to a reversible lane on bridge 116, and so forth. Henceforth, for illustrative purposes, various embodiments of the present disclosure are described in connection with steps, functions and/or operations performed by or facilitated by server 115.

Notably, server 115 may change the normal operating state of one or more roadway resources due to various conditions. For example, a traffic manager may be aware that a professional sporting event at a large stadium is about to end. Thus, server 115 may receive an instruction to alter the timing of one or more of traffic lights 114A-114C in order to better move the traffic out and away from the stadium. In one particular embodiment, the DSRC network 110 may control one or more roadway resources based upon a user's request to reach a destination by a desired time and in response to a willingness of the user to pay an appropriate fee to assist the user in meeting the desired time. This type of scenario is described in greater detail below.

In addition, each vehicle 120A-120C illustrated in FIG. 1 may be equipped with an associated on-board unit (OBU) for communicating with the server 115. For example, a traffic controller may provide server 115 with a warning that there is a roadway hazard, e.g., an icing condition, reported at the intersection of traffic light 114A. Accordingly, the server 115 may broadcast a warning message via one or more of the RSUs 112 near the intersection. In turn, the warning may be received by the OBU of any vehicle approaching the intersection to warn or instruct the driver to slow down and/or take other precautions. For example, the OBU may receive the message and present the text of the message on an in-vehicle display. Alternatively or in addition, the OBU may read the message via text-to-speech conversion. In one embodiment, the OBU of each of vehicles 120A-120C comprises a navigation unit, or is connected to an associated navigation unit. For example, the OBU may include a global positioning system (GPS) navigation unit that enables the driver to input a destination, and which determines the current location, calculates one or more routes to the destination, and assists the driver in navigating a selected route.

In one embodiment, the OBU of each of vehicles 120A-120C may communicate with DSRC network 110 and/or server 115, e.g., via one or more of the RSUs 112, to request navigation assistance. In particular, in one example the driver of vehicle 120A may be leaving for work and has an important meeting in only 20 minutes. The trip usually takes 30 minutes due to the fact that one must negotiate through a significant amount of traffic that includes a number of traffic lights along the normal route. However, the driver knows that when it is not rush hour, that the drive only takes approximately 15 minutes. In this case, the driver is willing to pay a significant fee to enable the driver to arrive on time. Accordingly, the driver of vehicle 120A may input a request to the OBU/navigation unit, indicating the office as the destination and indicating a willingness to pay up to $100 to make the trip in less than 20 minutes. The OBU may convey this to server 115. Server 115 may then determine based upon current traffic conditions, the distance and type of road, the speed limit, a number of traffic lights and so forth between the starting point and the destination, whether the requested/target arrival time is a possibility. In this regard, it should be noted that a target arrival time is not limited to specifying an exact time or specific time duration, but may also include a request to reach the destination as soon as possible. For example, the server 115 may determine one or more candidate routes to the destination. The server 115 may then select one of the routes that presents a lowest cost/least time solution. In one embodiment, the DSRC network 100 may then determine whether there are controllable roadway resources along the route that can be altered to assist the user in further reducing the anticipated travel time. For example, if there are 12 traffic lights along the route, the DSRC network 100 may determine that by controlling five of the lights to ensure green lights when the vehicle 120A approaches, this will be sufficient to help vehicle 120A arrive in less than 20 minutes. In one embodiment, server 115 then calculates a cost to charge the user based upon the number roadway resources (e.g., traffic lights, lift bridges over waterways and the like) that need to be controlled, the current traffic conditions, the current time of day and other conditions. If the cost is less than or equal to the maximum that the user is willing to pay, then the server 115 may transmit a message to the OBU to begin navigation. Otherwise the user may be notified that the trip cannot be completed in the time requested and/or at the price the user is willing to pay.

In addition, in one embodiment server 115 may continue to convey instructions to the vehicle 120A to assist in navigating the route. For instance, messages and/or instructions from server 115 may supersede or supplement instructions from the on-board navigation system. In one example, the instructions from server 115 may be transmitted to the OBU of vehicle 120A via RSUs 112. In another example, the instructions may be transmitted from server 115 to the OBU of vehicle 120A via cellular access network 120. For instance, where coverage of the DRSC network 110 is weak or non-existent, cellular access network 130 and base station 135 may supplement the coverage to ensure that instructions reach vehicle 120A.

In one embodiment, server 115 may attempt to clear one or more lanes on a road to assist vehicle 120A in meeting the arrival time. In other words, a lane of a road or a portion of a lane of a road may also be considered to be a controllable roadway resource. Thus, as an example, server 115 may broadcast messages via one or more of RSUs 112 that indicate to other vehicles on the road that travel in the left lane in a region near vehicle 120A is not permitted. Similarly, server 115 may indicate that travel in the left lane will temporarily cost $1.00 per mile to discourage other drivers from entering the lane, but so as to not completely prohibit the use of the left lane. For example, there may be other drivers on the road who are also willing to pay an extra fee to maintain the privilege of using the left lane. However, the price may be high enough to reduce the traffic in the left lane such that vehicle 120A may safely travel at a speed which will likely allow vehicle 120A to reach the destination on time. These and other exemplary scenarios are described in greater detail below in connection with FIG. 2B.

It should also be noted that in some circumstances it may be necessary or helpful to the DSRC network 110/server 115 to have a lane-level accurate view of the traffic and road conditions. Accordingly, in one embodiment, server 115 may track vehicles' OBUs via RSUs 112. For instance, in addition to broadcasting and or transmitting messages from server 115 to vehicles, RSUs 112 may also interrogate OBUs of passing vehicles to determine a level of traffic, to determine which specific vehicles are travelling on the road, e.g., for toll charging purposes, and so forth. However, it may not be feasible to determine lane-level vehicle positioning using only RSUs 112. In particular, it may be expensive to deploy and maintain a large number of RSUs 112, especially where separate RSUs may be required for each lane and for many miles of roadway.

Thus, in one embodiment the present network 100 also includes satellite infrastructure, e.g., satellite uplink 151 and satellite 152. In particular satellite 152 may broadcast GPS information that may be received by OBUs of vehicles 120A-120C. However, in one embodiment satellite 152 and the OBU of each vehicle 120A-120C may be also equipped for differential GPS (DGPS) and/or real-time kinematic (RTK) location sensing. For example, DGPS uses the differential of the phase of a signal from the GPS/satellite signal to determine position within far greater accuracy. Real-time kinematics (RTK) further enhances the accuracy by employing a fixed ground-based reference receiver. For instance, as a satellite moves, the position of the reference receiver remains the same and is able to determine the movement of the satellite. This information is then provided by the ground-based reference receiver to a moving DGPS receiver to assist in the location determination. In particular, the user of DGPS in combination with RTK enables location sensing within a few centimeters accuracy.

Returning to the present example, any one or more of RSUs 112 may comprise a reference receiver. Alternatively or in addition, base station 135 may comprise a reference receiver. Accordingly, the OBU of each of vehicles 120A-120C may resolve its position with high accuracy via any one or more of: DSRC communications from RSUs 112, DGPS signals from satellite 152, DGPS signals from satellite 152 in combination with RTK information from a reference receiver, and so forth. In particular, in one embodiment DGPS/RTK information may be used in conjunction with direct positioning information from RSUs 112 to provide redundancy and/or to provide coverage in areas where there is little to no infrastructure of DSRC network 110. However, in another embodiment, an OBU may solely use DGPS and/or DGPS/RTK information to determine vehicle position. In any case, the OBU of each of vehicles 120A-120C may then report a determined vehicle position to the DSRC network 110/server 115. For instance, an OBU may report location via DSRC messaging to RSUs 112 and/or via cellular communications with base station 135/cellular access network 130.

Accordingly, the DSRC network 110/server 115 may determine traffic and vehicle location information through several avenues. Equipped with a view of the traffic, server 115 may then control one or more roadway resources to reduce traffic, reroute traffic to avoid accidents, to assist users, such as the driver of vehicle 120A as described above, and so forth. In addition, server 115 may also track roadway usage by various vehicles to compute toll/usage charges, to determine moving violations, and for various other purposes. To illustrate, in the above example, server 115 may track the location of vehicle 120A to determine when it is approaching traffic light 114A in order to control the light at the relevant time when vehicle 120A will pass. For example, the normal operation of traffic light 114A may only need to be altered for one light cycle to allow vehicle 120A to pass. Thus, it may be least disruptive to other traffic to anticipate with high accuracy when vehicle 120A will approach and to alter the traffic light function for only as short a time period as necessary.

As further illustrated in FIG. 1, core network 140 also includes a server 145 which may perform the same or similar functions to server 115 in DSRC network 110. For example, DSRC network 110 may comprise just one portion of a region through which vehicle 120A may travel on a trip. For example, the route for the driver of vehicle 120A from home to work may cross bridge 116 from one state to another. The route may also traverse local roads, county roads, state roads, roads and infrastructure of a regional entity (e.g., an interstate agency, such as the Port Authority of New York and New Jersey), and so forth. Thus, in one example a telecommunications service provider, e.g., the operator of core network 140 and/or cellular access network 130 may implement functions of any one or more of the embodiments described herein.

For example, server 145 may determine a route for the driver of vehicle 120A to reach the desired destination (work) at the desired arrival time. The server 145 may also determine one or more traffic management regions traversed by the route, associated DSRC network(s) managing the infrastructure/roadway resources along the route, and so forth. The server 145 may then transmit instructions or requests to one or more DSRC networks to control one or more roadway resources in each network to assist the driver of vehicle 120A to meet the desired arrival time. Server 145 may also coordinate the apportionment of toll charging and billing of the vehicle 120A among the different entities managing and/or owning the infrastructure along the route.

The above network 100 is described to provide an illustrative environment in which embodiments of the present disclosure may be employed. In other words, the network 100 is merely illustrative of one network configuration that is suitable for implementing embodiments of the present disclosure. Thus, the present disclosure may also include any other different network configurations that are suitable for implementing embodiments of the present disclosure. For example, cellular access network 130 may comprise a wide area network (WAN), a series of LANs and so forth. Similarly, as illustrated in FIG. 1, DSRC network 110 may interconnect infrastructure elements in the 5.9 GHz DSRC band. However, the present disclosure is not limited to any specific protocol, such as DSRC, or any particular communication medium, e.g., the particular 5.9 GHz frequency band. For example, communications between OBUs and RSUs may involve radio frequency identification (RFID)

interrogation, or other forms of wireless communication. In addition, DSRC network 110 may include wired portions for connecting infrastructure elements to each other, to server 115 and so forth. In a further example, the satellite portion of network 100 may be omitted entirely, with positioning information determined by RSUs and/or base station 135. In still another example, the OBU of a vehicle may instead comprise a cellular telephone, a smart phone or other portable device which is removable from the vehicle and which supports additional functions besides DSRC messaging. Thus, networks including the above modifications and/or various additional modifications of the same or a similar nature are all included within the scope of the present disclosure.

Figure 2A:
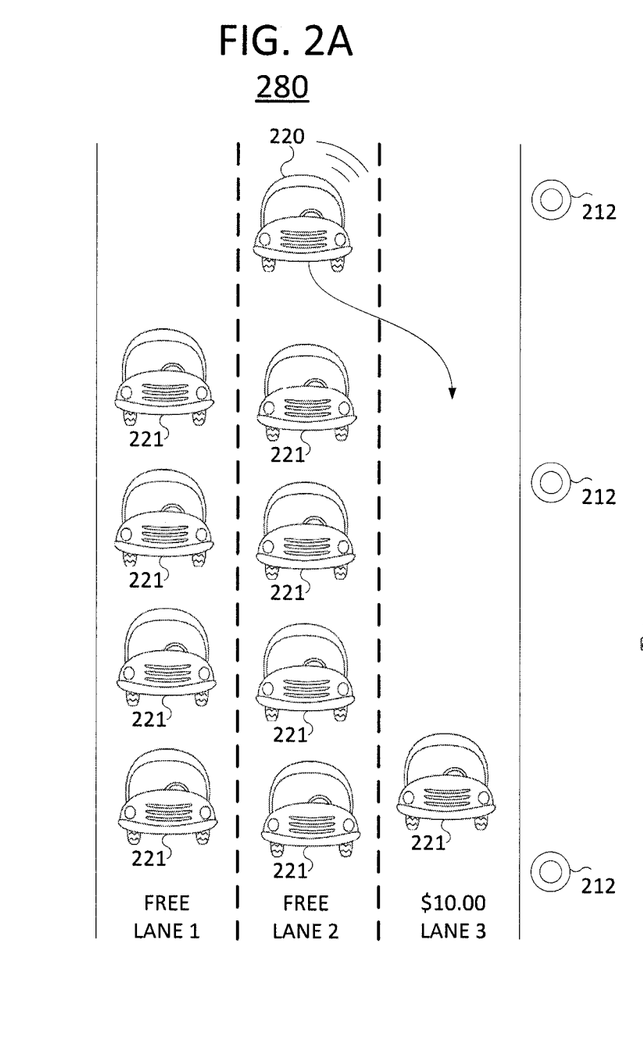
FIG. 2A illustrates one example of controlling a roadway resource, according to embodiments of the present disclosure.

To further aid in understanding the present disclosure, FIG. 2A illustrates an example of controlling a roadway resource, e.g., a lane of a roadway, in accordance with the present disclosure. For example, FIG. 2A illustrates a portion of a roadway 280 with three lanes and a number of associated roadside units (RSUs) 212. In the present example, the driver of vehicle 220 has requested assistance to meet a destination at a particular time. For example, a navigation assistance system, e.g., a DSRC network, a server and the like as illustrated in FIG. 1 and described above, may be controlling various roadway resources on behalf of the driver to enable the vehicle 220 to reach the destination on time. As illustrated in FIG. 2A, the system may select to clear a portion of lane 3 of the roadway 280 for vehicle 220. For instance, the system may select to temporarily increase the fee for using a portion of lane 3, the left-most lane of roadway 280, to $10.00. In one embodiment, the system may transmit this pricing information to all vehicles 221 on the roadway 280 via one or more RSUs 212.

Accordingly, as shown in FIG. 2A, most of the vehicles 221 have chosen to remain in lanes 1 and 2, which are free. A single other vehicle has chosen to remain in lane 3. However, lane 3 has substantially been cleared for vehicle 220. In one embodiment, the system may also transmit a message to vehicle 220, e.g., to the on-board unit (OBU) of vehicle 220 to instruct the driver that lane 3 has been specifically cleared for his or her use and that the vehicle 220 should be navigated into lane 3. Notably, in one example, the system may continue to monitor the level of traffic in lane 3. If, for instance, the traffic does not decrease sufficiently, the system may further raise the cost to encourage more vehicles to leave lane 3. In another example, the system may encourage other drivers to not drive in the lane 3 by offering a reward to the other drivers to refrain from travelling in lane 3. In one example, the system may determine lane-level traffic information by detecting vehicle positions through sensing of vehicle OBUs by the RSUs 212. In another example, the system may determine lane-level traffic information through DGPS and/or DGPS/RTK-derived location reports from the OBUs of various vehicles 221.

Figure 2B:
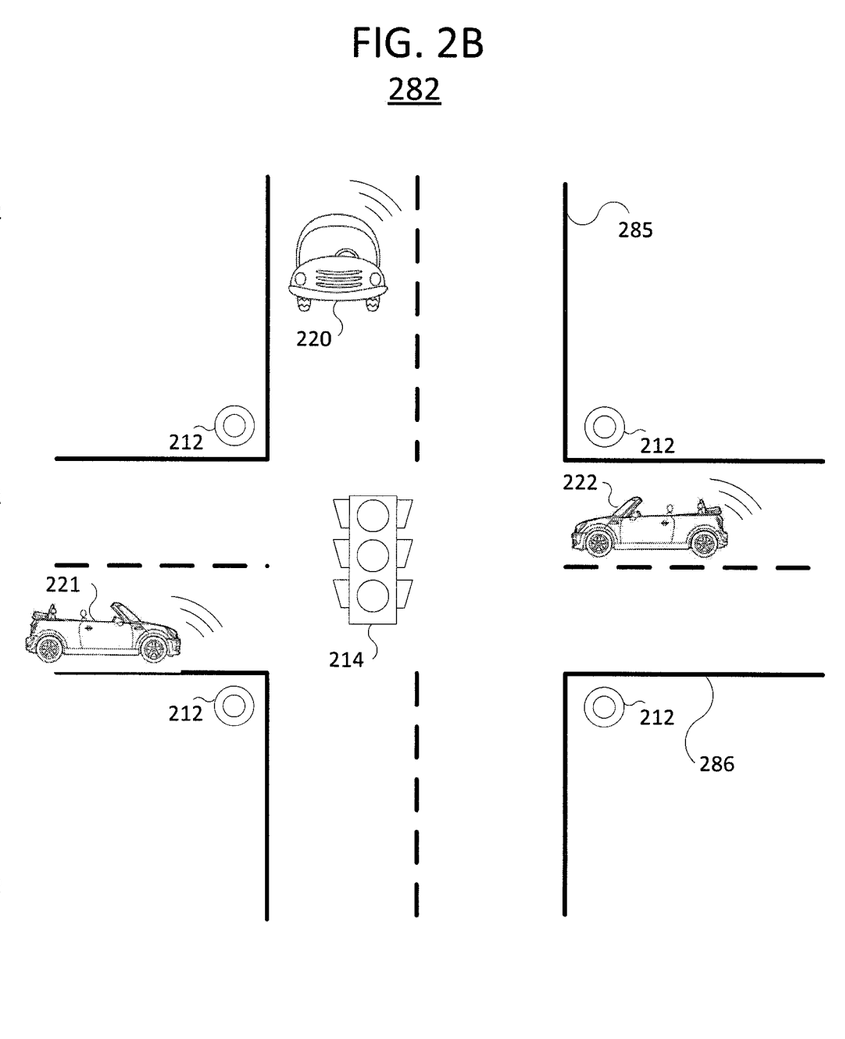
FIG. 2B illustrates another example of controlling a roadway resource, according to embodiments of the present disclosure.

FIG. 2B illustrates another example of controlling a roadway resource, e.g., a traffic light 214 at an intersection in a traffic management region 282, according to the present disclosure. In the present example, the driver of vehicle 220 has requested assistance to meet a destination at a particular time. For example, a navigation assistance system, e.g., a DSRC network, a server and the like as illustrated in FIG. 1 and described above, may be controlling various roadway resources on behalf of the driver to enable the vehicle 220 to reach the destination on time. As illustrated in FIG. 2B, the system may select to alter the normal traffic light timing or cycle of traffic light 214 to assist vehicle 220. For example, the traffic light 214 may be operating according to a normal pattern and be presenting a green light to vehicles 221 and 222 along roadway 286. However, the system may detect that vehicle 220 is now approaching the traffic light 214, e.g., vehicle 220 is within one block, is within 400 meters, and so forth. In one embodiment, the system may detect the position/location of vehicle 220, as well as the velocity and/or trajectory of vehicle 220 by interrogating vehicle 220's OBU with one or more RSUs 212. In another embodiment, the system may determine location and/or trajectory through DGPS and/or DGPS/RTK-derived location reports from the OBU of vehicle 220.

Thus, the system is able to calculate an anticipated arrival time for vehicle 220 to arrive at traffic light 214. As such, if the system anticipates that light 214 would normally be red in the direction of roadway 285 when the vehicle 220 is calculated to arrive, the system may alter, in advance, the light timing of traffic light 214 to ensure that the traffic light is green for vehicle 220. For example, the system may transmit an instruction to traffic light 214 to alter the light pattern as desired. In addition, the system may hold the traffic light 214 green in the direction of roadway 285 until it has determined that vehicle 220 is clear of the intersection. For instance, the system may transmit a further instruction to traffic light 214 to resume a normal cycle.

It should be noted that in one embodiment the driver of vehicle 220 is not the only driver who has requested assistance to reach a destination at a desired time. For example, the drivers of vehicles 221 and 222 may also be navigating routes that are controlled by the system, e.g., by a DSRC network. As illustrated in FIG. 2B, vehicles 220, 221 and 222 are all approaching traffic light 214 at substantially the same time. Thus, the system cannot control traffic light 214 favorably for all parties. Accordingly, in one embodiment, the system may select to control traffic light 214 favorably for vehicles 221 and 222, while making up time along the projected route for vehicle 220 in some other way. For instance, in an ideal scenario, the system might pre-calculate all routes in advance and arbitrate the control of different roadway resources to optimize the arrival time for all managed vehicles.

In another embodiment, the system may determine the maximum prices that the respective drivers are willing to pay and grant priority to one direction of travel or another based upon competitive bidding. For example, in one embodiment the system may aggregate the maximum amount that different drivers are willing to pay and grant priority to one particular direction of travel based upon a maximum collective amount which drivers who are travelling in that direction are willing to pay versus drivers traveling in a perpendicular direction at a crossing direction. For example, the driver of vehicle 220 may indicate a willingness to pay up to $100 to reach his destination on time. The driver of vehicle 221 may also indicate a willingness to pay $100 to reach her destination on time. In addition, the driver of vehicle 222 may indicate a willingness to pay $75. However, since vehicle 221 and 222 appear to be converging on traffic light 214 at the same time, their interests align in having traffic light 214 present a green light in the direction of roadway 286. Thus, the system may aggregate the maximum price that the driver of vehicle 221 is willing to pay with the maximum that the driver of vehicle 222 is willing to pay to arrive at a collective maximum of $175.

Vehicle 220 is also converging on the traffic light 214 at the same time, but from a perpendicular direction. Since he has only indicated a willingness to pay up to $100, vehicles 221 and 222 may be granted priority. However, it should be noted that a relatively greater charge may be made to vehicles 221 and 222 for the privilege. For example, the system may provide cost estimates not to exceed the maximum a driver is willing to pay prior to offering a route. However, the actual price charged may increase over the estimate based upon various conditions, e.g., converging on an intersection with other managed vehicles as just described. On the other hand, the actual price charged may also decrease from the estimate due to actual road conditions, e.g., an unusual clearing in traffic which results in there being no need to alter operations of any roadway resources.

It should be noted that the foregoing examples presented in connection with FIGS. 2A and 2B are provided for illustrative purposes only, and not by way of limitation. Thus, those skilled in the art will realize that other, further and different embodiments for controlling a roadway resource may be devised in accordance with the present disclosure. For instance, in just one additional example, a controllable roadway resource may comprise a reversible lane of a bridge or a tunnel. Thus, the system may control traffic lights on either side of the bridge or tunnel to allow traffic to flow on the reversible lane in one direction or another. Accordingly, in one embodiment the system may alter the flow of traffic on a reversible lane or hold the access to a reversible lane in a particular direction for a managed vehicle that is paying for navigation assistance and the management of roadway resources. In another scenario, the system may completely restrict access to a lane of a bridge or a tunnel to clear the lane for a managed vehicle. In another embodiment, the system may select which direction to allow a reversible lane to flow based upon aggregated maximum prices that drivers travelling in the opposite directions are willing to pay. In yet another embodiment, the roadway resource may comprise a drawbridge or lift bridge. Thus, the system may control the drawbridge to ensure that it is down when a managed vehicle approaches. For instance, if the drawbridge has a regular opening schedule, the system may indicate to the bridge or to a bridge operator to not raise the bridge as scheduled. Alternatively or in addition, the system may indicate to the bridge or a bridge operator that requests from vessels to open the bridge should be denied or postponed until the managed vehicle passes.

Figure 3:
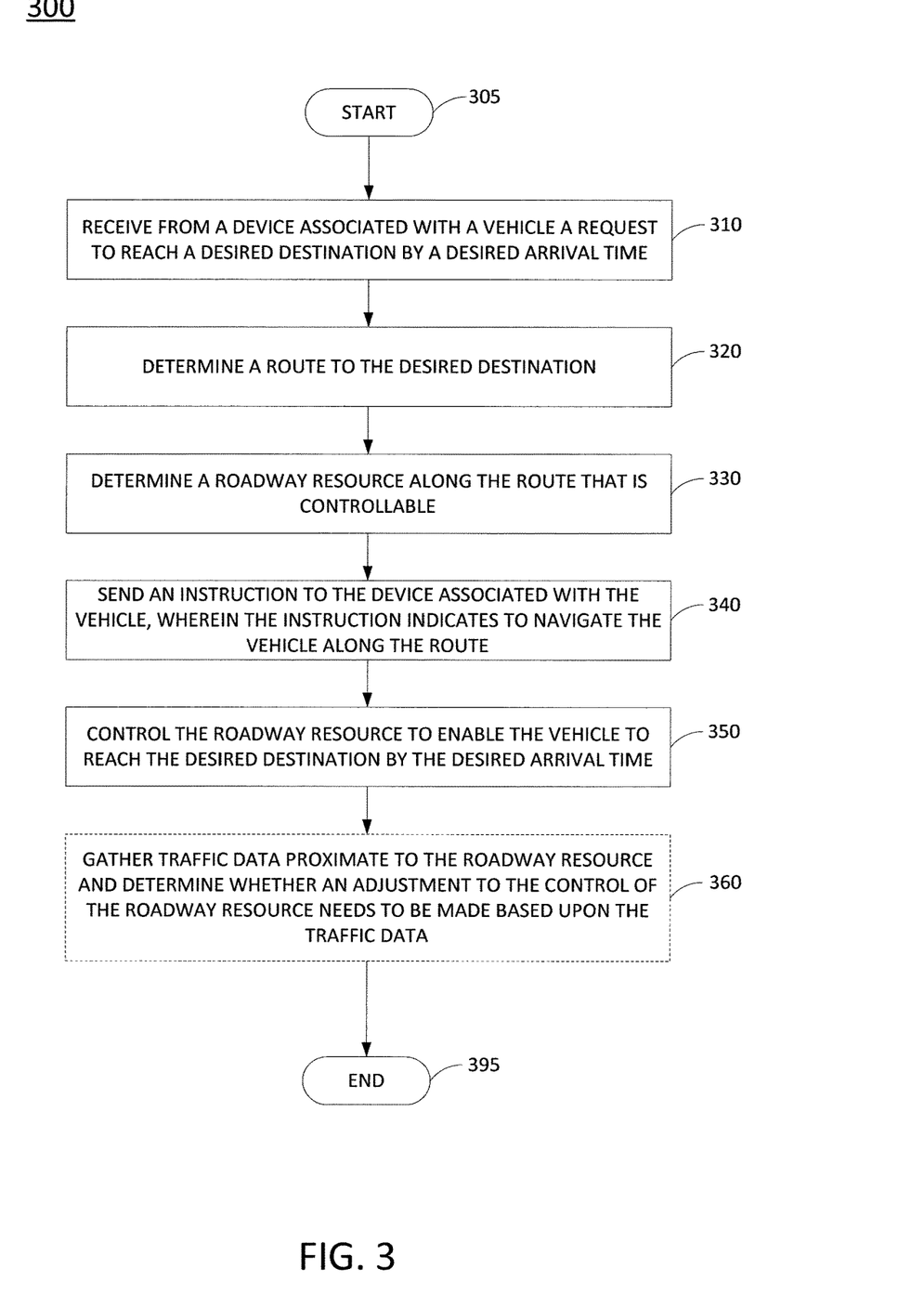
FIG. 3 illustrates a flowchart of a method for controlling a roadway resource, according to embodiments of the present disclosure.

FIG. 3 illustrates a flowchart of a method 300 for controlling a roadway resource. In one embodiment, the method 300 is performed by a server deployed in a DSRC network or other network, such as illustrated in FIG. 1. Alternatively, or in addition, the steps, functions, or operations of method 300 may be performed by a computing device or system 400, and/or processor 402 as described in connection with FIG. 4 below.

Method 300 starts in step 302 and proceeds to step 310. In step 310, method 300 receives from a device associated with a vehicle a request to reach a desired destination by a desired arrival time. For example, a driver of the vehicle may have an appointment or reservation that he does not want to miss. Accordingly, the driver may enter the destination and arrival time information in an on-board unit (OBU) or navigation system which may transmit a request message to method at step 310. In one example, the method 300 receives the message via DSRC network and/or via a cellular network.

At step 320, the method 300 determines a route to the desired destination. For example, the method 300 may determine the current location of the vehicle and calculate one or more routes to the desired destination. In one embodiment, the vehicle may determine its own location via the device associated with the vehicle and report the location to the method 300. In one embodiment, the device associated with the vehicle may calculate a location precisely using differential GPS (DGPS) and/or real-time kinematic (RTK) processing. For example, the device associated with the vehicle may be configured to receive DGPS signals from a satellite transmitter. In another embodiment, the method 300 may determine the current location of the vehicle using one or more roadside units (RSUs) of a dedicated short range communication (DSRC network). In one embodiment, at step 320 the method 300 selects a least time and/or lowest cost route to the destination from a set of candidate routes.

At step 330, the method 300 determines a roadway resource along the route that is controllable. For example, the method 300 may determine that one or more traffic lights, lanes of a road, bridge, tunnel or other thoroughfare, and the like, may be controlled to assist the vehicle in reaching the desired destination at the desired time. For instance, the method 300 may determine that there are one or more traffic lights that can potentially be controlled between the current location of the vehicle and the desired destination along the selected route. In addition, the method 300 may determine that by guaranteeing one or more of the traffic lights will be favorable to the vehicle as the vehicle passes, the trip from the origin to the destination can be achieved in the desired time. In such case, the method 300 may determine that the selected route is a viable route.

In one embodiment, at step 330 the method 300 may further prompt the device associated with the vehicle for a maximum amount the user is willing to pay to reach the destination by the desired time. At step 330, the method 300 may further calculate a cost to charge for controlling the roadway resource and an estimated cost to reach the desired destination by the desired time. For example, the method 300 may calculate an estimated cost to charge the user based upon the number of roadway resources to control, the cost to control each roadway resource, the current traffic, time of day and other conditions. In one embodiment, if the estimated cost is less than the maximum amount the user is willing to pay, the method 300 may then transmit the estimated cost to the device associated with the vehicle. For example, the method 300 may send a message to the device associated with the vehicle over a DSRC network and/or via a cellular network. In another embodiment, if the estimated cost exceeds the amount the user is willing to pay, the method 300 may transmit a notification which may also include the estimated amount and/or an option for the user to respond with an indication that he or she is willing to pay at least the estimated amount.

At step 340, the method 300 sends an instruction to the device associated with the vehicle for navigating the vehicle along the route. For example, the method 300 may transmit information pertaining to the selected route such that the device associated with the vehicle may assist the driver in navigating the route. In one embodiment, the method sends the instruction via a message over a DSRC network and/or via a cellular network.

At step 350, the method 300 controls the roadway resource to enable the vehicle to reach the desired destination by the desired arrival time. It should be noted that the method 300 may control the controllable resource through various communication channels such as a DSRC network, a wired or wireless wide area network and so forth. For example, as mentioned above the method 300 may determine that by controlling one or more traffic lights along the route, the vehicle should be able to arrive by the desired time. Thus, at step 350, the method may control at least one of the traffic lights to guarantee that it is favorable to the vehicle as it approaches. For instance, the method 300 may present a green light in a direction in which the vehicle is travelling as it approaches the light.

In one embodiment, the method 300 further tracks a movement of the vehicle along the route. For example, the method 300 may use the tracking information to anticipate when the vehicle will approach the traffic light or other roadway resource. In one embodiment, the vehicle may determine its own location via the device associated with the vehicle and report the location to the method 300. In one embodiment, the device associated with the vehicle may calculate a location precisely using differential GPS (DGPS) and/or real-time kinematic (RTK) processing. For example, the device associated with the vehicle may be configured to receive DGPS signals from a satellite transmitter. In another embodiment, the method 300 may determine the current location of the vehicle using one or more roadside units (RSUs) of a dedicated short range communication (DSRC network).

In one example, the controllable roadway resource comprises a traffic light. However, in another example, the controllable roadway resource comprises a selected lane of a road. As such, in one example step 350 may comprise increasing a toll fee for the selected lane, e.g., to reduce the number of vehicles travelling in the selected lane. In addition, the method 300 may also send a further instruction to the device associated with the vehicle indicating to navigate the vehicle in the selected lane. For example, the method 300 may convey the instruction via a message over a DSRC network and/or via a cellular network to the device associated with the vehicle. In turn, the device associated with the vehicle may then display or read out the message to assist the user in navigating into the selected lane. For instance, the message may indicate to the user/driver that the lane has been cleared specifically for his or her use. In still another embodiment, the roadway resource that is controllable comprises a reversible lane, e.g., of a bridge or a tunnel. Thus, in one example step 350 may comprise directing a flow of traffic in the reversible lane in a direction in which the vehicle is travelling along the route.

Following step 350, the method 300 may proceed to step 395 where the method ends, or may proceed to optional step 360. At optional step 360, the method 300 may gather traffic data proximate to the roadway resource and determine whether an adjustment to the control of the roadway resource needs to be made based upon the traffic data. For example, the method 300 may also be assisting another vehicle in reaching a desired destination at a desired time and may detect that the two vehicles will now be approaching the same roadway resource at the same time. In addition, the method may detect that the two vehicles may have two different requirements for the roadway resource. For instance, the method 300 may determine that if a traffic light is green for one of the vehicles, it will be red for the other vehicle, and vice versa. As such, the method 300 may determine which vehicle should have priority at the roadway resource and control the roadway resource accordingly. For instance, the method 300 may grant priority to the vehicle of the user that is willing to incur the greater cost. In one embodiment, if one of the vehicles is negatively impacted, the method 300 may select an additional roadway resource along the route for that vehicle to make up lost time.

Following either of steps 350-360, the method 300 proceeds to step 395 where the method ends.

In addition, although not specifically specified, one or more steps, functions or operations of the method 300 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the example embodiments of the present disclosure.

Figure 4:
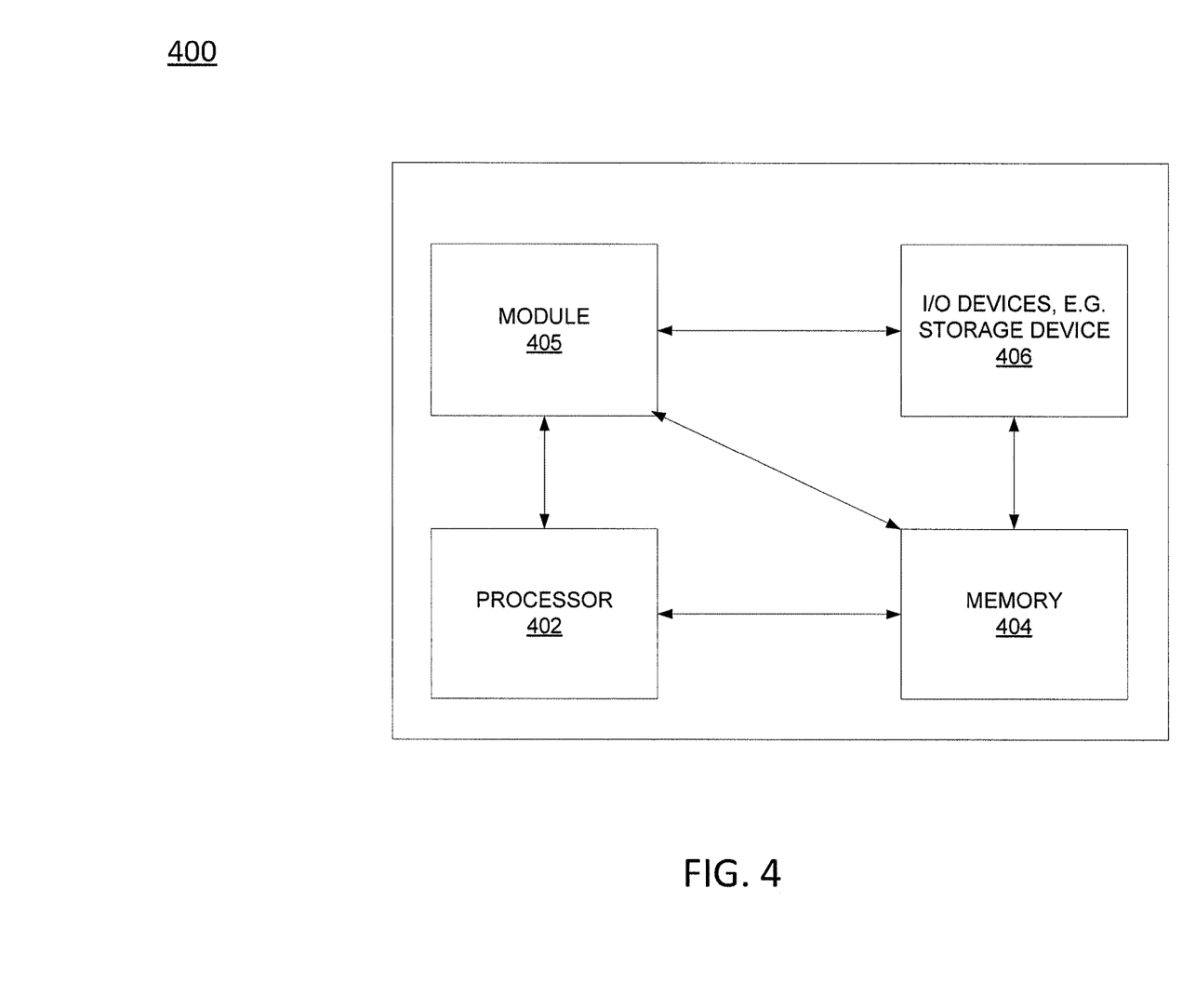
FIG. 4 illustrates a high-level block diagram of a general-purpose computer suitable for use in performing the functions, methods and algorithms described herein.

FIG. 4 depicts a high-level block diagram of a general-purpose computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for controlling a roadway resource, and various input/output devices 406 (e.g., storage devices, including but not limited to, a tape drive, a floppy drive, a hard disk drive or a compact disk drive, a receiver (e.g., having one or more network interfaces), a transmitter (e.g., having one or more network interfaces), a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one embodiment, instructions and data for the present module or process 405 for controlling a roadway resource (e.g., a software program comprising computer-executable instructions) can be loaded into memory 404 and executed by hardware processor element 402 to implement the steps, functions or operations as discussed above in connection with the exemplary method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for controlling a roadway resource (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for controlling a roadway resource, the method comprising:
    receiving, by a processor from a device associated with a vehicle, a request to reach a target destination by a target arrival time, wherein the request includes the target arrival time that predefines a specific requested arrival time to arrive at the target destination;
    determining, by the processor, a route to the target destination;
    determining, by the processor, the roadway resource along the route that is controllable;
    sending a first instruction, by the processor, to the device associated with the vehicle, wherein the first instruction indicates to navigate the vehicle along the route;
    controlling, by the processor, the roadway resource to enable the vehicle to reach the target destination by the target arrival time specified in the request, wherein the controlling comprises sending a second instruction to change a state of the roadway resource, wherein the roadway resource comprises a selected lane of a road, and wherein the controlling the roadway resource comprises increasing a toll fee for the selected lane for a selected time period, the toll fee comprising a monetary charge for vehicles to travel in the selected lane, to reduce a number of the vehicles travelling in the selected lane during the selected time period;
    sending, by the processor, a further instruction to the device associated with the vehicle, wherein the further instruction indicates to navigate the vehicle in the selected lane; and
    tracking, by the processor, a movement of the vehicle on the selected lane along the route for controlling the roadway resource.

2. The method of claim 1, wherein the controlling the roadway resource further comprises presenting a green signal in a direction in which the vehicle is travelling as the vehicle approaches a traffic light.

3. The method of claim 1, wherein the selected lane comprises a reversible lane.

4. The method of claim 3, wherein the controlling the roadway resource further comprises directing a flow of traffic in the reversible lane in a direction in which the vehicle is travelling along the route.

5. The method of claim 3, wherein the reversible lane is a reversible lane of a tunnel.

6. The method of claim 3, wherein the reversible lane is a reversible lane of a bridge.

7. The method of claim 1, further comprising:
    receiving a maximum payment amount that a user associated with the vehicle is willing to pay to reach the target destination by the target arrival time.

8. The method of claim 1, further comprising:
    calculating a cost for controlling the roadway resource; and
    calculating an estimated cost to reach the target destination by the target arrival time using the route that is determined and including the cost for controlling the roadway resource.

9. The method of claim 8, further comprising:
    presenting the estimated cost to the device associated with the vehicle.

10. The method of claim 8, further comprising:
    notifying the device associated with the vehicle that the estimated cost is greater than a maximum payment amount that a user associated with the vehicle is willing to pay to reach the target destination by the target arrival time.

11. The method of claim 1, further comprising:
    gathering traffic data proximate to the roadway resource; and
    determining whether an adjustment to the control of the roadway resource needs to be made based upon the traffic data.

12. The method of claim 11, wherein the traffic data indicates that another vehicle requires an adjustment to the control of the roadway resource.

13. The method of claim 1, wherein the route is selected from a plurality of candidate routes, wherein the route is a lowest cost route of the plurality of candidate routes.

14. A computer-readable storage device storing instructions which, when executed by a processor, cause the processor to perform operations for controlling a roadway resource, the operations comprising:
    receiving, from a device associated with a vehicle, a request to reach a target destination by a target arrival time, wherein the request includes the target arrival time that predefines a specific requested arrival time to arrive at the target destination;
    determining a route to the target destination;
    determining the roadway resource along the route that is controllable;
    sending a first instruction to the device associated with the vehicle, wherein the first instruction indicates to navigate the vehicle along the route;
    controlling the roadway resource to enable the vehicle to reach the target destination by the target arrival time specified in the request, wherein the controlling comprises sending a second instruction to change a state of the roadway resource, wherein the roadway resource comprises a selected lane of a road, and wherein the controlling the roadway resource comprises increasing a toll fee for the selected lane for a selected time period, the toll fee comprising a monetary charge for vehicles to travel in the selected lane, to reduce a number of the vehicles travelling in the selected lane during the selected time period;

sending a further instruction to the device associated with the vehicle, wherein the further instruction indicates to navigate the vehicle in the selected lane; and tracking a movement of the vehicle on the selected lane along the route for controlling the roadway resource.

15. An apparatus for controlling a roadway resource, the apparatus comprising:

a processor; and a computer-readable storage device storing instructions which, when executed by the processor, cause the processor to perform operations, the operations comprising:

receiving, from a device associated with a vehicle, a request to reach a target destination by a target arrival time, wherein the request includes the target arrival time that predefines a specific requested arrival time to arrive at the target destination;

determining a route to the target destination;

determining the roadway resource along the route that is controllable;

sending a first instruction to the device associated with the vehicle, wherein the first instruction indicates to navigate the vehicle along the route;

controlling the roadway resource to enable the vehicle to reach the target destination by the target arrival time specified in the request, wherein the controlling comprises sending a second instruction to change a state of the roadway resource, wherein the roadway resource comprises a selected lane of a road, and wherein the controlling the roadway resource comprises increasing a toll fee for the selected lane for a selected time period, the toll fee comprising a monetary charge for vehicles to travel in the selected lane, to reduce a number of the vehicles travelling in the selected lane during the selected time period;

sending a further instruction to the device associated with the vehicle, wherein the further instruction indicates to navigate the vehicle in the selected lane; and tracking a movement of the vehicle on the selected lane along the route for controlling the roadway resource.

16. The apparatus of claim 15, wherein the controlling the roadway resource further comprises presenting a green signal in a direction in which the vehicle is travelling as the vehicle approaches a traffic light.

17. The apparatus of claim 15, wherein the selected lane comprises a reversible lane, and wherein the controlling the roadway resource further comprises directing a flow of traffic in the reversible lane in a direction in which the vehicle is travelling along the route.

18. The apparatus of claim 15, the operations further comprising:

calculating a cost for controlling the roadway resource; and calculating an estimated cost to reach the target destination by the target arrival time using the route that is determined and including the cost for controlling the roadway resource.

19. The apparatus of claim 18, the operations further comprising:

presenting the estimated cost to the device associated with the vehicle.

20. The apparatus of claim 18, the operations further comprising:

notifying the device associated with the vehicle that the estimated cost is greater than a maximum payment amount that a user associated with the vehicle is willing to pay to reach the target destination by the target arrival time.

* * * * *

UNITED STATES PATENT AND TRADEMARK OFFICE
CERTIFICATE OF CORRECTION

PATENT NO. : 10,748,229 B2  
APPLICATION NO. : 14/133408  
DATED : August 18, 2020  
INVENTOR(S) : Brian S. Amento et al.

Page 1 of 1

It is certified that error appears in the above-identified patent and that said Letters Patent is hereby corrected as shown below:

On the Title Page (54), delete "SOURCE" after ROADWAY and insert therefor -- RESOURCE --.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*